United States Patent
Marcantonini

(10) Patent No.: US 8,784,255 B2
(45) Date of Patent: Jul. 22, 2014

(54) MECHANICAL SPEED VARIATOR WITH ECCENTRIC DYNAMIC MASSES HAVING A BALANCED STRUCTURE

(76) Inventor: Mario Marcantonini, Bettona (IT)

(*) Notice: Subject to any disclaimer, the term of this patent is extended or adjusted under 35 U.S.C. 154(b) by 0 days.

(21) Appl. No.: 13/696,642

(22) PCT Filed: May 24, 2011

(86) PCT No.: PCT/EP2011/058490
§ 371 (c)(1),
(2), (4) Date: Nov. 7, 2012

(87) PCT Pub. No.: WO2011/147839
PCT Pub. Date: Dec. 1, 2011

(65) Prior Publication Data
US 2013/0059692 A1 Mar. 7, 2013

(30) Foreign Application Priority Data
May 27, 2010 (IT) .............................. AN2010A0085

(51) Int. Cl.
*F16H 25/04* (2006.01)
(52) U.S. Cl.
USPC ........................... 475/170; 475/179; 475/181
(58) Field of Classification Search
USPC .................... 475/166, 170, 181, 178, 179, 17
See application file for complete search history.

(56) References Cited

U.S. PATENT DOCUMENTS

| 5,433,672 A * | 7/1995 | Tanaka et al. ................. 475/178 |
| 2004/0198543 A1 | 10/2004 | Christ |
| 2005/0039572 A1 | 2/2005 | Friedmann |

FOREIGN PATENT DOCUMENTS

| DE | 3802528 A1 | 8/1988 |
| EP | 1640638 A2 | 3/2006 |

OTHER PUBLICATIONS

International Search Report for corresponding International Application No. PCT/EP2011/058490.

* cited by examiner

*Primary Examiner* — Sherry Estremsky
*Assistant Examiner* — Lillian Nguyen
(74) *Attorney, Agent, or Firm* — Egbert Law Offices, PLLC

(57) ABSTRACT

A mechanical speed variator is provided with eccentric masses having a balanced structure. The variator includes a drive shaft, provided with a cam composed of a circular disk eccentrically mounted on the drive shaft, which drives the driven shaft in rotation with interposition of a series of eccentric masses, each of them being composed of a circular disk with eccentric circular hole in which another mass of lower dimensions is ratably housed. The larger mass is housed and rotates inside the eccentric hole of a ring coupled with bolts to a flange and counter flange, respectively mounted on the driven shaft and the drive shaft.

1 Claim, 2 Drawing Sheets

MECHANICAL SPEED VARIATOR WITH ECCENTRIC DYNAMIC MASSES HAVING A BALANCED STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present patent application for invention relates to a mechanical speed variation with eccentric masses, having a balanced structure.

2. Description of Related Art Including Information Disclosed Under 37 CFR 1.97 and 37 CFR 1.98.

The variator of the invention is an improvement of a previous model of variator founded on the same operating principle.

Said operating principle is based on the use of a cam composed of a circular disk eccentrically mounted on the drive shaft, which drives into rotation the driven shaft with interposition of a series of eccentric masses, each of them being composed of a circular disk with eccentric circular hole in which another mass with lower dimensions is ratably housed.

More precisely, the drive shaft drives said cam into rotation around the axis of rotation of the drive shaft, which from now onwards will be defined as main axis of rotation of the variator.

Said cam is housed inside a circular hole eccentrically obtained on a first mass, composed of a disk with center not coincident with the main axis of rotation, so that said first mass is actually driven in revolution around the drive shaft.

Said first mass is housed inside a circular hole eccentrically obtained on a second larger mass, composed of a disk with center coincident neither with the main axis of rotation nor with the center of the first mass, so that also said second mass is driven in revolution around the drive shaft.

Said second mass is housed inside the circular hole of a ring concentric to the second mass, which represents the driven part, assuming the revolution of said second mass.

Said ring is provided with bolt-holding wings of different length that, in addition to tighten multiple assembled variators, transmit the revolution of the ring, as rotary motion, to the driven shaft coaxial to the drive shaft.

A variation like the one described above is disclosed in patent EP 1640 638.

This type of variator has immediately shown balancing problems that have practically impaired industrial exploitation.

BRIEF SUMMARY OF THE INVENTION

The purpose of the present invention is to remedy such a balancing problem, by providing a speed variator of the type described above, which has an intrinsically balanced structure in each dynamic configuration.

In the improved variator that is the object of the present patent application, the problem of balancing is solved in principle, in its structural composition, with the use of a constructive system that is simple to implement, valid in any case and for each model of variator of this kind that may be realized.

The main characteristics of the improved variator of the invention are disclosed in the enclosed claims.

BRIEF DESCRIPTION OF THE DRAWINGS

For purposes of clarity the description of the variator of the invention continues with reference to the enclosed drawings, which are intended for purposes of illustration only and not in a limiting sense, wherein.

DETAILED DESCRIPTION OF THE INVENTION

Figure 2:
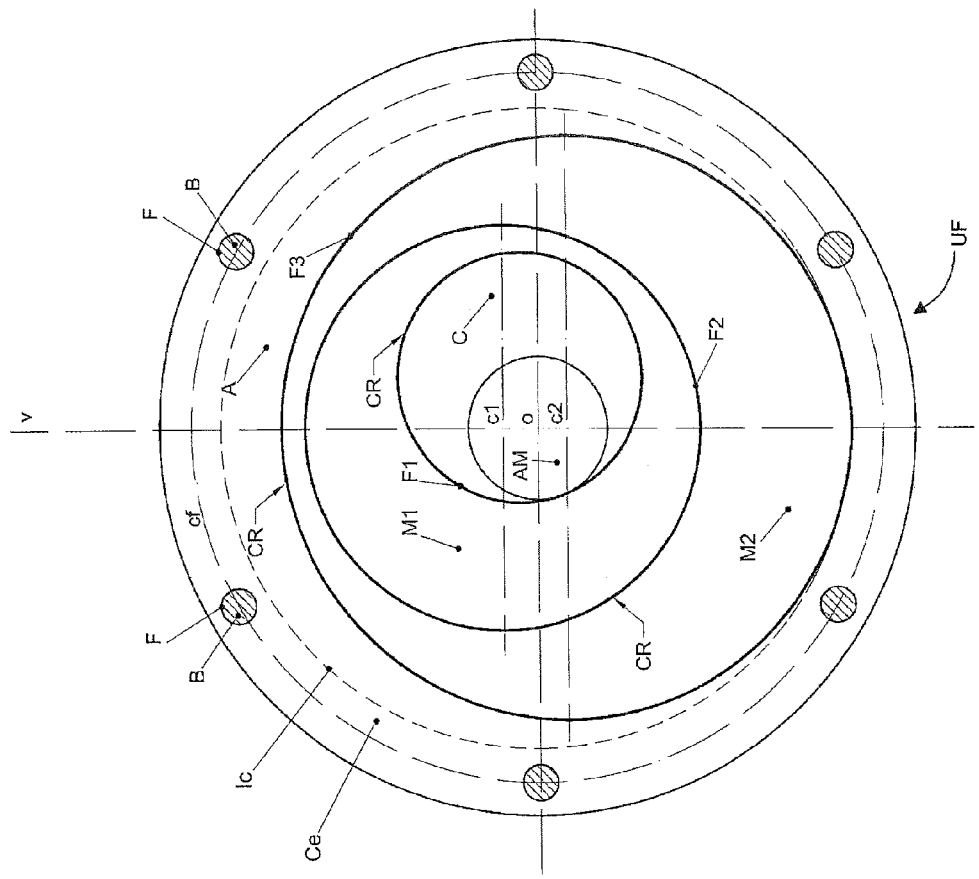
FIG. 2 is a cross-section of FIG. 1 with plane II-II.

First of all, it must be noted that the variator of the invention can be coupled with other identical variators to originate a complex variator with modular structure, as per the enclosed claims.

Referring to the aforementioned figures, the basic version of the variator, which is defined as functional unit (UF), is described.

Said functional unit (UF) comprises:
- a drive shaft (AM), with axis of rotation (o) defined as main axis of rotation of the variator;
- a cam (C) composed of a disk that revolves jointly with the drive shaft (AM);
- a first mass (M1) composed of a disk with centre (d) not coincident with the main axis of rotation (o), which is provided with an eccentric hole (F1) in which said cam (C) is exactly housed and free to rotate with interposition of sliding bearings (CR);
- a second mass (M2) composed of a disk with centre (c2) coincident neither with the main axis of rotation (o) nor with the centre (c1) of the first mass (M1), said second mass (M2) being provided with an eccentric hole (F2) in which said first mass (M1) is exactly housed and free to rotate with interposition of sliding bearings;
- a ring (A) composed of a disk with centre coincident with the main axis of rotation (o) and provided with an eccentric hole (F3) in which said second mass (M2) is exactly housed and free to rotate with interposition of sliding bearings (CR).

The ring (A) can be imaginarily divided into two annular portions, separated by a circumference (1c) with center on the main axis of rotation (o) and tangent to the hole (F3):
- the external portion consists in a circular crown (Ce) with regular shape, the internal circumference (1 c) of which coincides with said demarcation circumference (1c),
- the internal portion consists in the minimum ring (Am) with eccentric shape.

The minimum ring (Am) represents the ring (A) in its theoretical minimum dimensions.

Inside the external crown (Ce) the ring (A) is provided with an annular series of regularly spaced holes (F), specifically six holes, with centers lying all on the same circumference (cf) with center coincident with the main axis of rotation (o).

These characteristics of the ring (A), which are compliant and useful for the realization of the variator of the new invention, are not satisfied in the homologous ring of the known model of variator disclosed in patent EP 1 640 638.

By revolving, the drive shaft (AM) drives the first mass (M1) through the cam (C) in alternate rotation on the center (d) and in discontinuous revolution around the drive shaft; said first mass drives the second mass (M2) in discontinuous rotation on the center (c2).

The accelerations and decelerations of the two masses originate forces, the resultant of which is a force passing through the center (c2) of the second mass with direction normal to the arm (o-c2).

The force induces the second mass to a revolution around the drive shaft, which is transmitted to the ring (A) coupled with bolts (B) to a flange (FL) and a counter flange (CFL), respectively mounted on the driven shaft (AC) and the drive shaft (AM), both having the center on the main axis of rotation (o).

Through the arm (o-c2) the forces generate the torque that is transmitted by the drive shaft to the driven shaft.

Evidently, the ring (A) drives in rotation the driven shaft (AC) with interposition of said flange (FL) which is joined to the ring (A) on one side, and to the driven shaft (AC) on the other side.

Figure 1:
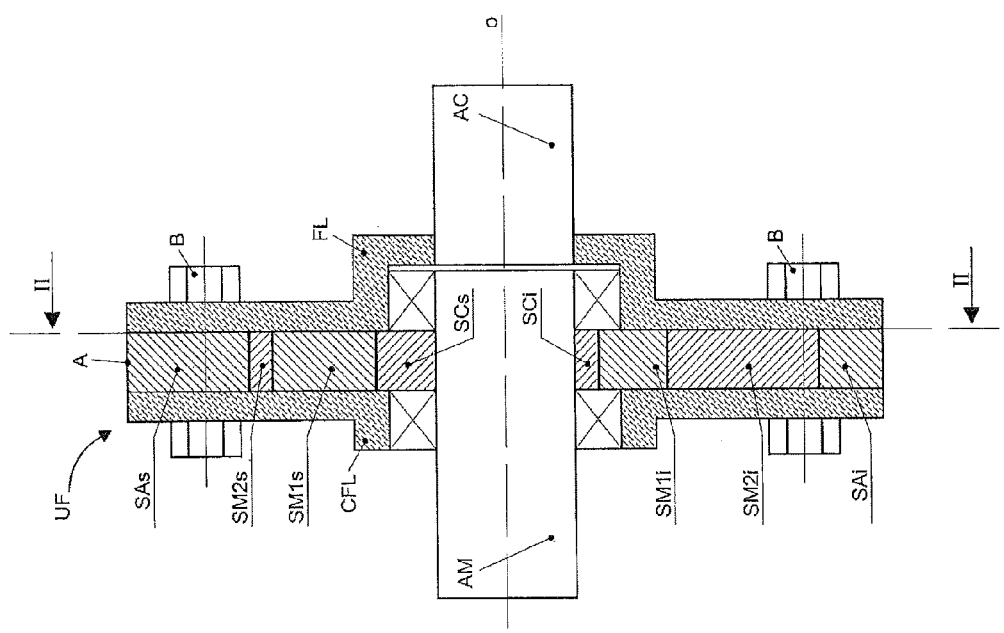
FIG. 1 is a cross-sectional view of the variator of the invention with a vertical plane passing through the main axis of rotation.

Such a functional unit is provided with an intrinsically balanced structure for the reasons explained below, with the help of FIG. 1 that shows the sectioned parts of each constructive component.

More precisely, the following parts can be identified above the drive shaft (AM):
the upper segment of the cam (SCs);
the upper segment of the first mass (SM1s);
the upper segment of the second mass (SM2s);
the upper segment of the ring (SAs).

Whereas the following parts can be identified under the drive shaft (AM):
the lower segment of the cam (SCi);
the lower segment of the first mass (SM1s);
the lower segment of the second mass (SM1s);
the lower segment of the ring (SAi).

Upon rotation of drive shaft (AM) each segments takes its own motion. The motion of the segments of cam and driven shaft corresponds to rotation, whereas the motion of the segments of the two eccentric masses corresponds to the resultant of the complex motions.

Given that segments have a minimum thickness, the mass value of each segment can be considered to be equivalent to its surface.

The two parts of the variator are considered, i.e. the part above and the part under the drive shaft. The summation of the products of the surface of each segment by the angular speed of the barycenter of its relevant segment with respect to the main axis of rotation (o), by the distance of the barycenter of the same segment from the main axis of rotation (o). The dynamic balance of the functional unit is obtained when, in any point of rotation, said summation calculated for one part is equal to the same summation calculated for the opposite part, that is to say when the summation of the angular momentums of the two parts is zero.

Such a situation is satisfied with these conditions:
the geometrical shape of the functional unit (UF) is regular and concentric on the main axis of rotation (o);
the mass value is homogeneous on the entire geometrical extension of the functional unit (UF).

These conditions are met:
by providing a ring (A), the external crown (Ce) of which has mass distributed in such a way to be balanced with respect to the main axis of rotation (o);
by using sliding bearings (CR) with negligible lack of mass homogeneity.

As mentioned above, because of the arm formed from misalignment (o-c2), the torque transmitted by the drive shaft (AM) to the driven shaft (AC) is generated.

The entity of said torque depends, in quadratic mode, on the difference in radial speed between drive shaft and driven shaft.

Because of their particular motions, the masses (M1 and M2) accelerate and decelerate periodically at every revolution of the drive shaft (AM). Therefore, the value of the torque transmitted by a single functional unit (UF) has a discontinuous progression that is periodically repeated at ever revolution.

As mentioned earlier, said functional units are adapted to be mutually coupled. It is therefore possible to assemble multiple functional units (UF), thus originating a complex variator with modular structure (UFA), as per the enclosed claims, and obtain a sufficiently homogeneous transmitted torque.

As mentioned above, by assembling multiple functional units (UF) a complex variator (UFA) is obtained, in which the total transmitted torque is sufficiently continuous.

Figure 3:
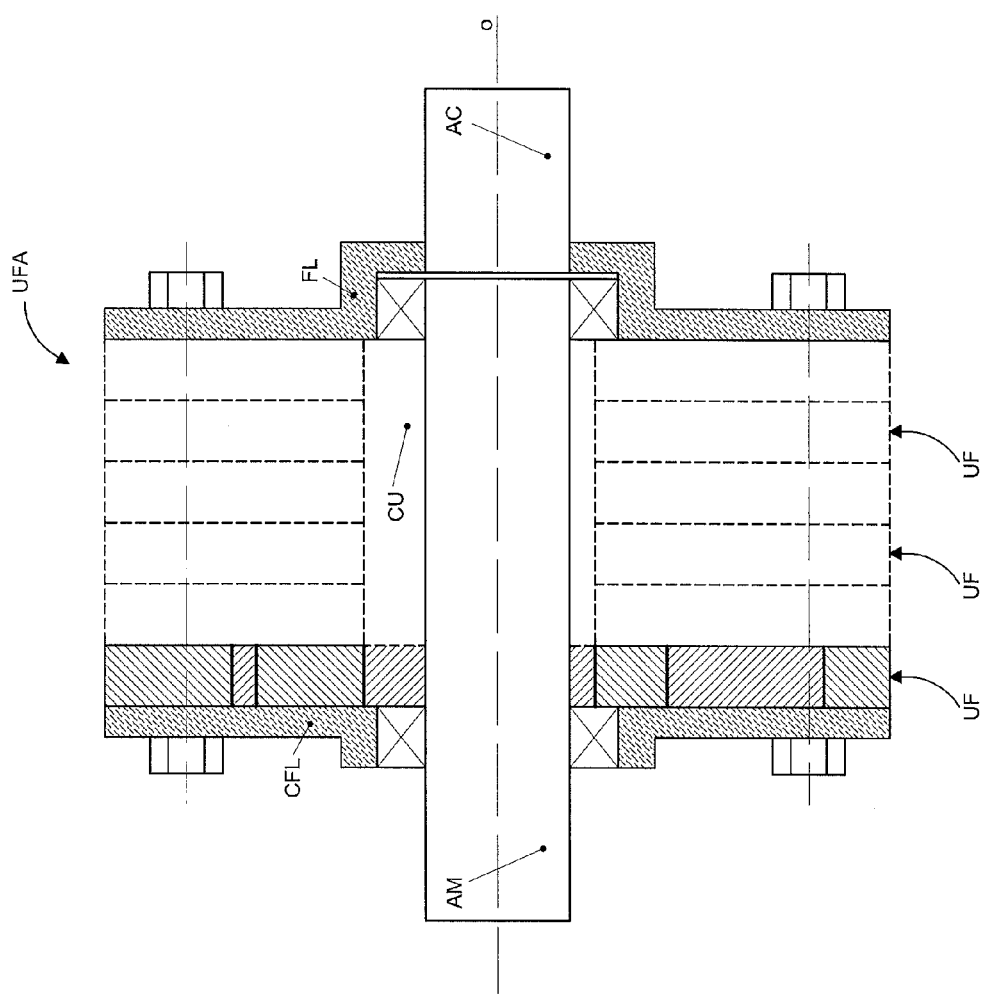
FIG. 3 is the same view as FIG. 1, except for it refers to a constructive embodiment of the complex variator of the invention.

FIG. 3 diagrammatically shows said complex variator with modular structure, wherein each functional unit (UF) coupled with the first one is drawn with a broken line.

According to this constructive embodiment of the variator of the invention, the drive shaft is provided with a single cam (CU) that drives into rotation all functional units (UF) assembled in angularly staggered mode.

More precisely, if six functional units (UF) are to be coupled, as shown in FIG. 3, each flange must have six holes (F) staggered by 60°, in such a way that also the six functional units (UF) can be staggered, one after the other, by a progressive angle of 60° and mutually connected by means of corresponding bolts passing through the holes (F). The identical functional units that are regularly staggered by the same angle provide maximum continuity of the transmitted torque in relation to the number of assembled functional units.

The complex variator (UFA) formed of multiple assembled functional units is always balanced, regardless of the number of the assembled units, being composed of single functional units balanced in any point of their rotation.

Mass additions or reductions can be carried out in the variator of the invention, either regarding the individual functional unit or the modular structure of the complex variator, as long as said operations are carried out according to the principle of mutual balance, that is with neutral effect with respect to the balancing system of the invention.

The variator can work in both directions.

The variator can also work by inverting the drive shaft with the driven shaft.

The invention claimed is:
1. A complex variator apparatus comprising:
a single drive shaft having an axis of rotation, said axis of rotation being a main axis of rotation of the complex variator apparatus;

a single cam integral with and revolvable jointly with said single drive shaft;

a plurality of individual variators in which each individual variator comprising:

at least one first mass formed of a disk having a center that does not coincide with said main axis of rotation, the first mass having an eccentric hole, said single cam housed within and freely rotatable within said eccentric hole;

at least one second mass formed of a disk with a center that does not coincide with either of said main axis of rotation and said center of the first mass, the second mass having an eccentric hole in which the first mass is housed within and freely rotatable therein;

a ring having a disk shape and having a center coinciding with said main axis of rotation, said ring having an eccentric hole within which the second mass is housed within and freely rotatable therein;

a plurality of sliding bearing positioned between said cam and the first mass and between the first mass and the second mass and between the second mass and said ring, said ring having holes evenly angularly spaced, said holes having centers lying on a common circle in which the common circle has a center coincident with said main axis of rotation, said common circle being concentric with and internal to a circular crown, said circular crown having an internal circumference tangent to the hole;

a flange and a counter flange respectively coupled to the ring of a first individual variator and a last individual variator of said plurality of individual variators by means of bolts inserted into the holes of the rings, said flange and said counter flange being respectively mounted on a driven shaft and said single drive shaft, each of said flange and said counter flange having a center coincident with said main axis of rotation, said single cam being coupled with all of the first masses, said plurality of individual variators being mounted on said single cam in a progressively staggered manner one-after-another by a common angle with a value equal to a ratio between a round angle and a number of said plurality of individual variators, the ring of each individual variator having a number of the holes equal to the number of said plurality of individual variators.

* * * * *